US008110016B2

(12) United States Patent
McCollam

(10) Patent No.: US 8,110,016 B2
(45) Date of Patent: Feb. 7, 2012

(54) FLUID FILTER ASSEMBLY INCLUDING SEAL

(75) Inventor: Robert P. McCollam, Roseville, MN (US)

(73) Assignee: Dow Global Technologies LLC, Midland, MI (US)

(*) Notice: Subject to any disclaimer, the term of this patent is extended or adjusted under 35 U.S.C. 154(b) by 507 days.

(21) Appl. No.: 12/332,464

(22) Filed: Dec. 11, 2008

(65) Prior Publication Data
US 2010/0147761 A1 Jun. 17, 2010

(51) Int. Cl.
*B01D 46/00* (2006.01)
*B01D 27/00* (2006.01)

(52) U.S. Cl. .............. 55/502; 55/498; 55/520; 210/450; 210/497.01

(58) Field of Classification Search ................ 210/348, 210/398, 426, 433.1, 450; 55/490, 502, 506, 55/348, 398, 426, 433.1, 450; 277/371, 394, 277/395, 418, 438–439, 481, 491, 528, 530, 277/567
See application file for complete search history.

(56) References Cited

U.S. PATENT DOCUMENTS

| 4,016,083 | A | * | 4/1977 | Sakaguchi et al. ....... 210/321.83 |
| 4,277,338 | A | * | 7/1981 | Hoagland ................. 210/186 |
| 4,299,702 | A | | 11/1981 | Bairinji et al. |
| 4,358,377 | A | * | 11/1982 | Clark ...................... 210/323.2 |
| 4,411,783 | A | * | 10/1983 | Dickens et al. ............. 210/304 |
| 4,600,512 | A | | 7/1986 | Aid |
| 5,130,022 | A | * | 7/1992 | Chara .................... 210/450 |
| 5,167,818 | A | * | 12/1992 | Baert et al. .............. 210/321.87 |
| 5,178,753 | A | * | 1/1993 | Trabold ................. 210/130 |
| 5,389,260 | A | | 2/1995 | Hemp |
| 5,552,047 | A | * | 9/1996 | Oshida et al. ........... 210/321.8 |
| 6,224,767 | B1 | | 5/2001 | Fujiwara et al. |
| 6,286,838 | B1 | | 9/2001 | Kruger et al. |
| 6,299,772 | B1 | | 10/2001 | Huschke et al. |
| 6,543,625 | B1 | * | 4/2003 | Le Roux et al. ........... 210/483 |
| 6,592,758 | B2 | * | 7/2003 | Quintel ................. 210/232 |
| 6,758,970 | B1 | * | 7/2004 | Nurminen et al. .......... 210/232 |
| 6,966,940 | B2 | * | 11/2005 | Krisko et al. ............. 55/497 |
| 7,198,719 | B2 | | 4/2007 | Chikura et al. |
| 7,208,088 | B2 | * | 4/2007 | Almasian et al. ......... 210/321.76 |
| 2003/0057148 | A1 | * | 3/2003 | Zuk, Jr. .................. 210/445 |
| 2003/0217534 | A1 | * | 11/2003 | Krisko et al. .............. 55/337 |
| 2004/0194441 | A1 | * | 10/2004 | Kirsch ................... 55/497 |
| 2005/0103703 | A1 | * | 5/2005 | Young et al. ............. 210/450 |
| 2005/0173319 | A1 | | 8/2005 | Fritze et al. |
| 2006/0091064 | A1 | * | 5/2006 | Brown et al. ............. 210/450 |
| 2007/0029237 | A1 | * | 2/2007 | Crawford et al. .......... 210/130 |
| 2007/0284300 | A1 | * | 12/2007 | Bidlingmeyer et al. ...... 210/450 |
| 2008/0136117 | A1 | * | 6/2008 | Roe et al. ............... 277/530 |
| 2010/0224161 | A1 | * | 9/2010 | Kolczyk et al. .......... 123/196 A |

FOREIGN PATENT DOCUMENTS

| DE | 10356809 | 12/2005 |
| WO | 9718882 | 5/1997 |

\* cited by examiner

*Primary Examiner* — Duane Smith
*Assistant Examiner* — Thomas McKenzie
(74) *Attorney, Agent, or Firm* — Edward W. Black

(57) ABSTRACT

The present invention is directed toward fluid filter assemblies along with methods for making and using the same. The fluid filter assemblies include a ring-shaped seal disposed about a portion of an outer periphery of a filter module. In several embodiments the seal includes an inner surface having at least two parallel contact surfaces separated by a channel, wherein the contact surfaces are in sealing engagement with the outer periphery of the filter module. Additional embodiments are also described.

9 Claims, 6 Drawing Sheets

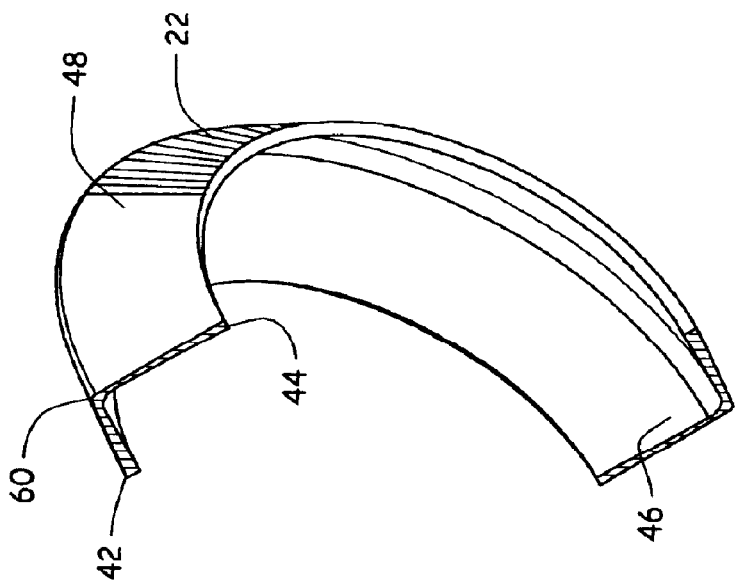
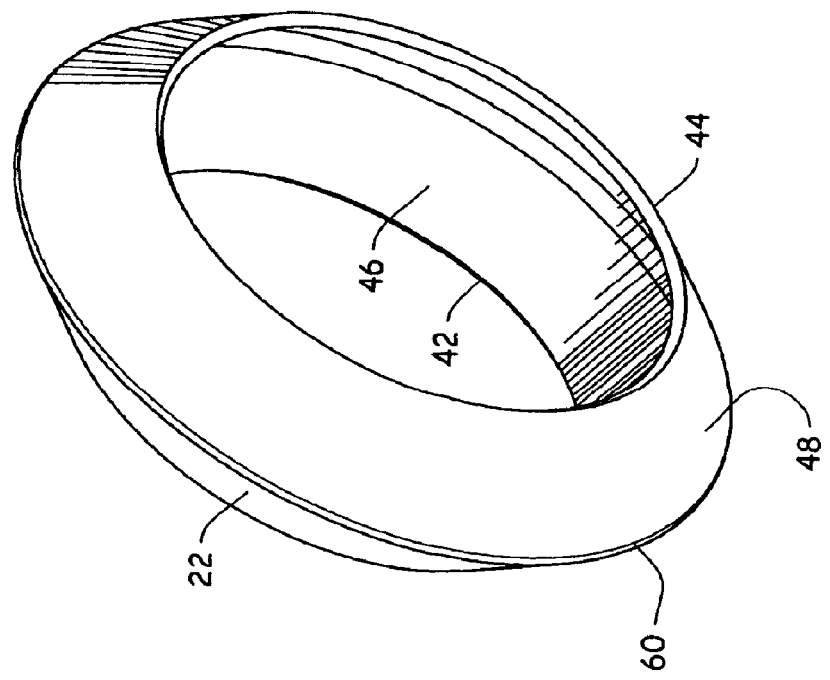
FIG 5-B
FIG 5-A

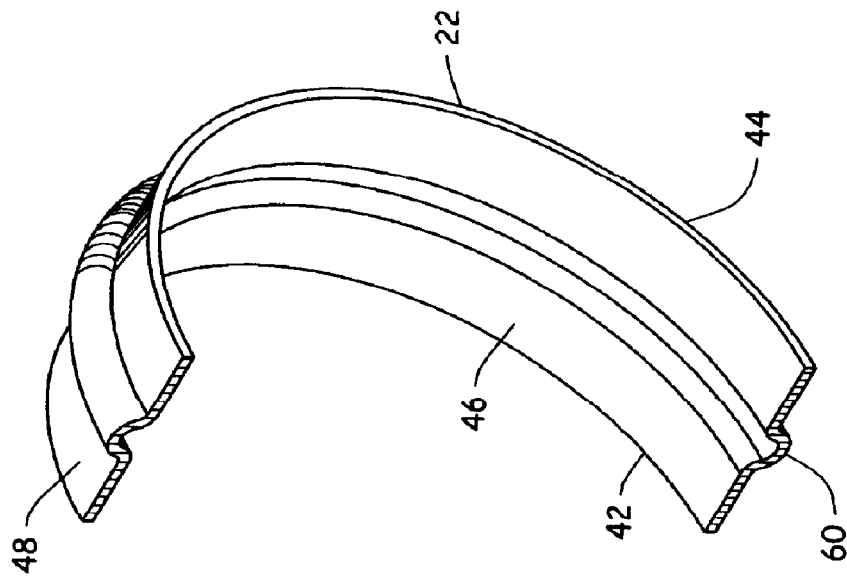
FIG 6-B
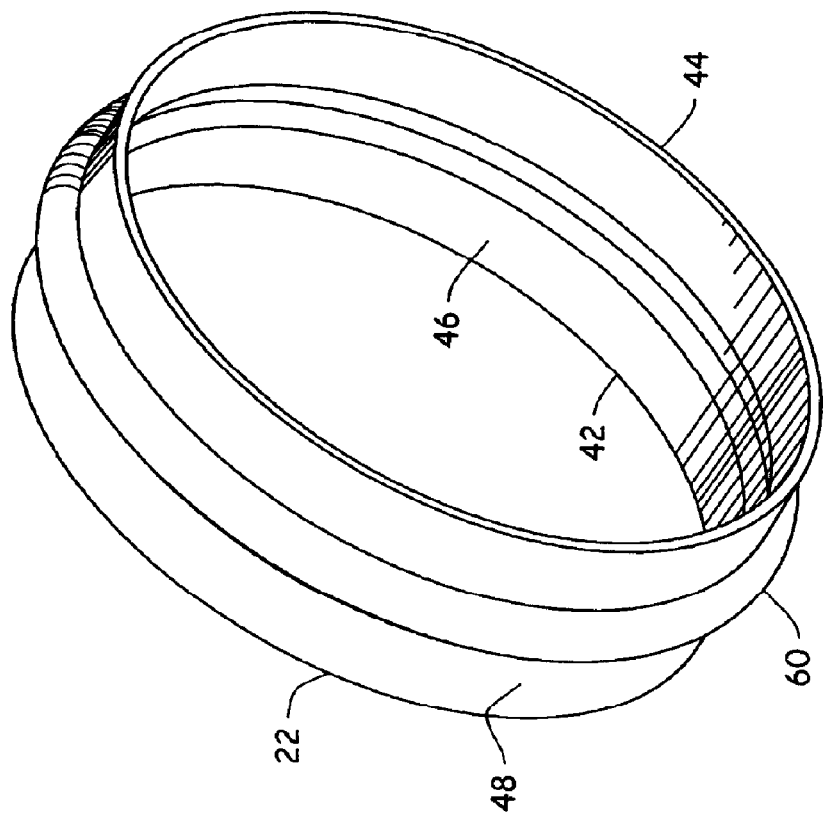
FIG 6-A

FLUID FILTER ASSEMBLY INCLUDING SEAL

BACKGROUND OF THE INVENTION (1) Field of the Invention

The present invention is directed toward fluid filter assemblies and associated assembly components including a filter module and a ring-shaped fluid seal.

(2) Description of the Related Art

Fluid filter assemblies are used in a wide variety of applications ranging from industrial processing of liquids and gases to residential purification of drinking water. Such assemblies commonly include a filter module and a fluid seal. In operation, the filter module is positioned within a housing (e.g. pressure vessel) with one or more seals located between the inner periphery of the housing and the outer periphery of the filter module. A primarily purpose of the seal is to ensure that fluid entering the housing is directed along a predetermined path, e.g. through the filter module. The seal may also serve to position or orientate the module within the housing. Ring seals are commonly used in fluid filter assemblies. Such seals, sometimes referred to as "brine seals," typically include a tubular body or sleeve which engages the outer surface of the filter module and an outwardly extending skirt, cup-shaped flange or concavo-convex flange portion designed to sealingly engage the inner peripheral surface of the housing. The tubular body portion of the seal is commonly secured about the outer surface of the filter module with adhesive tape. In operation, the skirt or flange portion of the seal prevents fluid from flowing around the filter module. Examples of such assemblies are provided in U.S. Pat. No. 5,389,260 and U.S. Pat. No. 4,016,083.

U.S. Pat. No. 6,299,772 describes a fluid filter assembly utilizing a foam-in-place seal (e.g. injection molded polyurethane foam) along with seals (both foam and non-foam) which are secured about a filter module using a shrink wrap material.

U.S. Pat. No. 7,208,088 describes a fluid filter assembly utilizing a chevron seal secured about a spiral wound module by a retaining ring. The seal includes holes for permitting a predetermined quantity of feed liquid to by-pass the cartridge.

BRIEF SUMMARY OF THE INVENTION

The present invention is directed toward fluid filter assemblies along with methods for making and using the same. The fluid filter assemblies include a ring-shaped seal disposed about a portion of an outer periphery of a filter module. In several embodiments the seal includes an inner surface having at least two parallel contact surfaces separated by a channel, wherein the contact surfaces are in sealing engagement with the outer periphery of the filter module. Additional embodiments are also described.

BRIEF DESCRIPTION OF THE DRAWINGS

The invention and various embodiments may be better understood by reference to the detailed description and accompanying figures. Within these sections, like reference numerals refer to like elements.

FIG. 5-A is a perspective view of an uninstalled seal corresponding to the seal of FIG. 3.

FIG. 5-B is a cross-sectional, partially cut-away view of the seal shown in FIG. 5-A.

FIG. 6-A is a perspective view of an uninstalled seal corresponding to the seal of FIG. 4.

FIG. 6-B is a cross-sectional, partially cut-away view of the seal shown in FIG. 6-A.

DETAILED DESCRIPTION OF THE INVENTION

Figure 1:
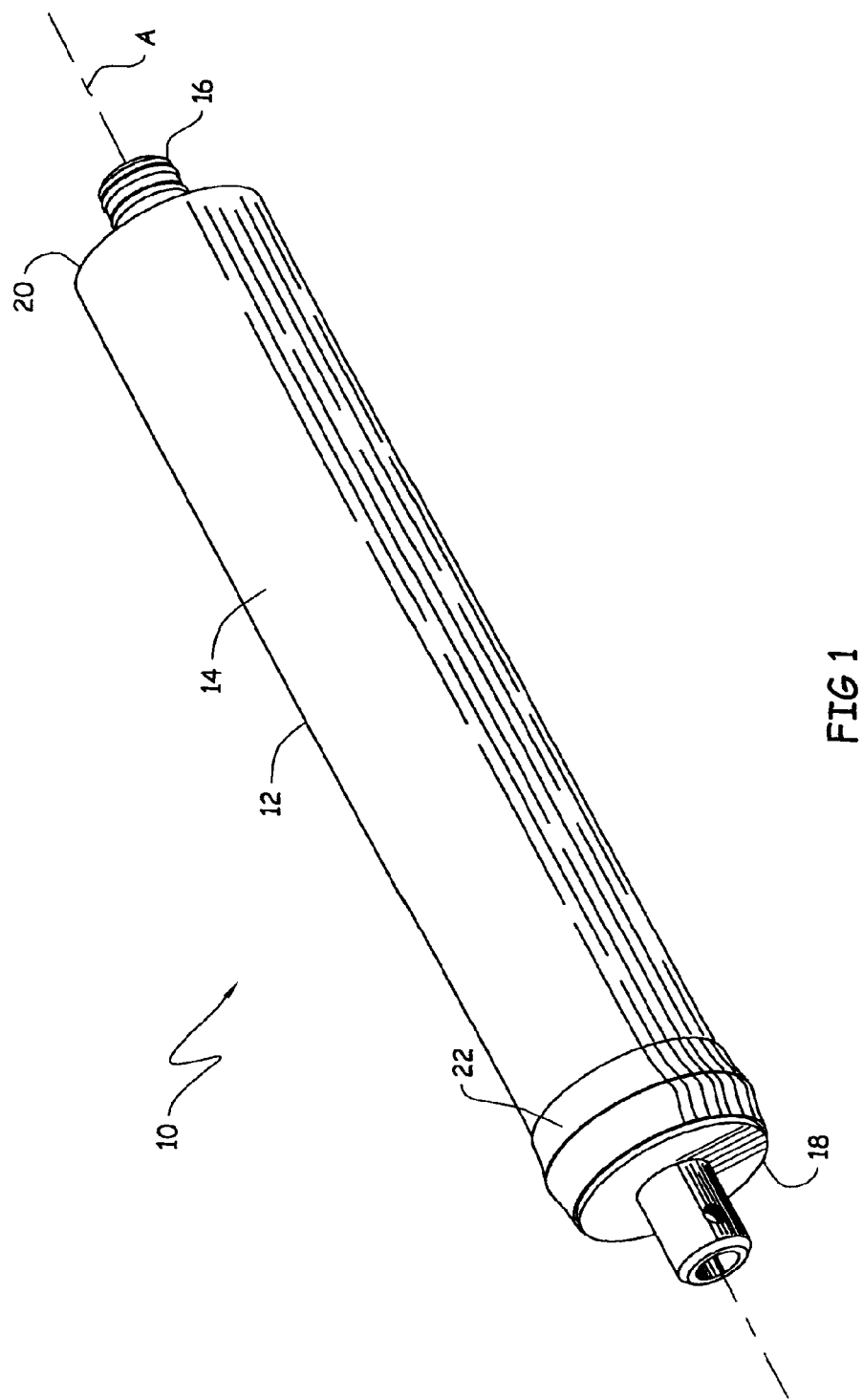
FIG. 1 is a perspective view of a fluid filter assembly according to one embodiment of the invention including a filter module and seal.

Fluid filter assemblies of the present invention include a filter module. For purposes of the invention, the filter module is not particularly limited and includes membrane-based modules (e.g. spiral wound, hollow fiber, capillary and tubular membrane modules or "elements") and media-based modules (e.g. a cartridge of granular-type material such as ion exchange resin, adsorbent media, e.g. carbon, titanium oxide and the like). The outer periphery of the module is preferably elongated having a length greater than its width with a cross-section which is elliptical or polygonal. In one preferred embodiment, the outer periphery of the filter module is cylindrically-shaped having a circular cross-section. The outer surface of the module typically comprises a plastic sheathing material such as polyethylene, polypropylene or polyvinyl chloride in the form of a tape or film. In high pressure applications, fiber reinforced plastics such as long glass fibers coated with a epoxy resin may be used. Stainless steel or other metallic materials may also be used. An example of an applicable filter module is a spiral wound, reverse osmosis element designed for household drinking water such as: FILMTEC™ TW30-1812-36 available from the FilmTec Corporation.

The seals of the present invention are preferably "ring-shaped". The term "ring-shaped" is intended to describe a continuous loop or ring of material. The size and shape of the inner periphery of the seal (i.e. the space within the loop) is designed to accommodate the insertion of the filter module so that the seal is disposed about a portion of the outer periphery of the filter module. As the seal is preferably made from an elastomeric material, the inner periphery of the seal need not correspond to the exact shape or dimension of the module but is preferably able to form an interference fit therewith. By way of example, many modules have a cylindrical outer periphery. For such cylindrical modules, preferred seals may include an elliptical inner periphery having an inner diameter of approximately the same but preferably smaller (e.g. 5-25% smaller) than the outer diameter of the module so that the seal is stretched about the outer periphery of the module and forms an interference fit. While in most embodiments the inner periphery of the seal is circular, the inner periphery may include alternative shapes including other elliptical shapes or may be polygonal. The term "interference fit" is intended to broadly describe a fastening or attachment of two or more parts by way of friction. In the present case, the friction force holding the seal to the module is largely a function of the tensile strength, elongation and modulus of the seal. In a preferred embodiment, the interference fit between the seal and the module comprises a fluid tight seal and is the sole source of sealing engagement between the seal and module. That is, while adhesives, tapes or other means may be used to secure the seal to the module, in a preferred embodiment the seal is sealingly engaged about the filter module by way of an interference fit without the use of adhesive, tape, shrink wrap materials or other such means. In this preferred embodiment, the seal may be installed, removed, adjusted and/or re-installed by manually overcoming the friction and elastomeric forces holding the seal about the module without destroying the seal or without addition steps including the removal of tape or adhesive. Thus, the sealing engagement is preferably reversible. The terms "sealingly engage" and "sealing engagement" are intended to describe a fluid tight seal. Once installed about the module, the seal forms a band or length of continuous material about the outer periphery of the filter module. The width of the seal is typically less than the length of the filter module and most commonly comprises a relatively narrow band of continuous material about only a portion of the outer periphery of the filter module. The width of seal is not particularly limited and will depend upon the specific design of the filter module and other factors such as the length of the module, fluid operation pressure, tolerance between the module and housing, the number of seals utilized per module, etc. In most applications the seal has a width of from 0.1-10 cm and more preferably from 1-3 cm. One or more seals may be used per filter module. While not critical for most embodiments, the seal(s) is typically located near the end(s) of the filter module.

With reference to FIG. 1, a representative fluid filter assembly is generally shown at (10), including filter module (12) having a cylindrical outer periphery (14). In the embodiment shown, the filter module (12) is a spiral wound element including a permeate tube (16) which defines a central axis (A) extending along the length of the module (12) between two opposite ends (18, 20). A ring-shaped seal (22) is disposed about a portion of an outer periphery (14) of the filter module (12), located near the end (18) of the module (12).

Figure 2:
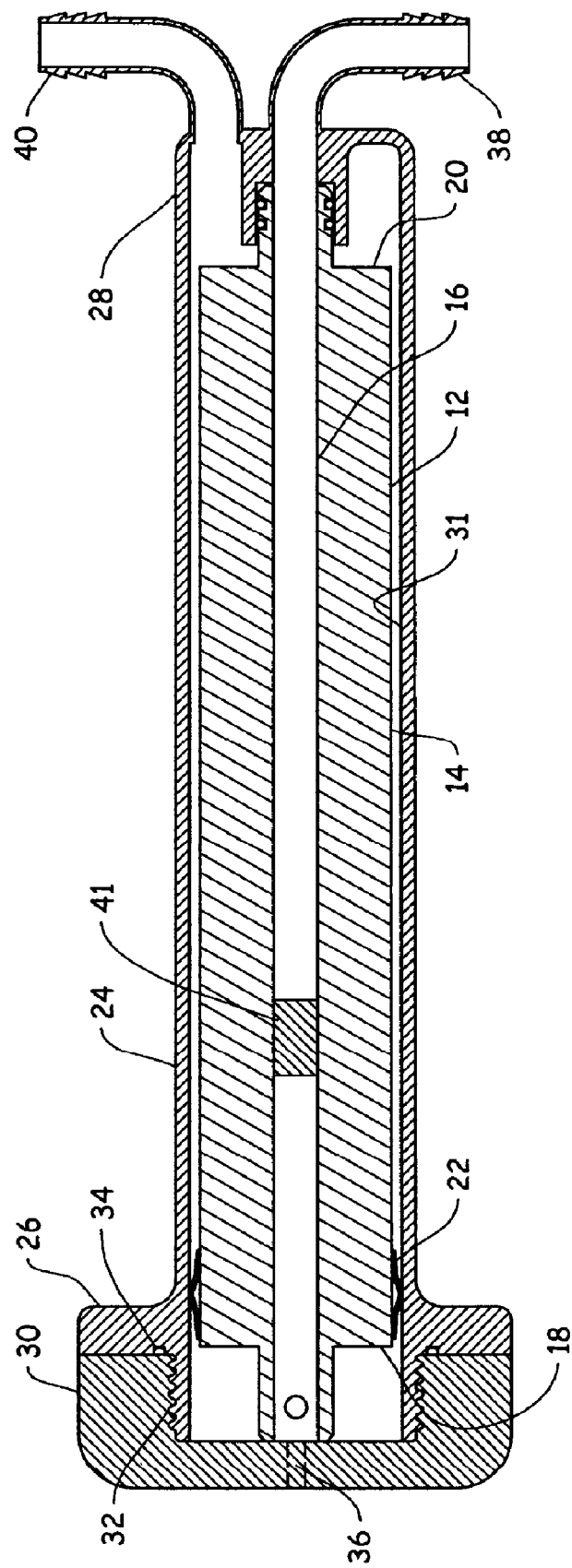
FIG. 2 is a cross-sectional elevational view of a fluid filter assembly according to another embodiment of the invention including the filter module and seal of FIG. 1 positioned within a housing.

FIG. 2 illustrates another embodiment of the fluid filter assembly including the filter module (12) and seal (22) of FIG. 1 positioned within a housing (24). The housing (24) includes a first (26) and second (28) end. The first end (26) includes a removable cap (30) which provides access to the inner periphery (31) of the housing (24). In the embodiment shown, the cap (30) is threaded (32) and includes an O-ring seal (34) and fluid inlet (36). The second end (28) of the housing (24) includes a permeate fluid outlet (38) and feed or concentrate fluid outlet (40). The inner periphery (31) of the housing (24) defines a cylindrical chamber that is slightly larger than the outer periphery (14) of the cylindrical filter module (12). The seal (22) disposed about the filter module (12) extends outward from the module (12) and contacts and forms a sealing engagement with the inner periphery (31) of the housing (24). In operation, pressurized fluid (e.g. feed water) is introduced to the housing (24) via fluid inlet (36) and flows through the filter module (12) with concentrate exiting the housing (24) via fluid outlet (40) and permeate exiting via fluid outlet (38). Plug (41) prevents pressurized feed from passing directly through the module (12) via the permeate collection tube (16). Seal (22) prevents fluid from bypassing (i.e. flowing around) the filter module (12). The seal may also help position, center or otherwise support the filter module (12) within the inner periphery (31) of the housing (24). While shown as including only one seal located near the end (18) of the filter module (12), two or more seals may be used and the seal(s) may be located along the filter module (12) at alternative locations.

The specific design and construction of the housing are not particularly limited. That is, while the housing illustrated in FIG. 2 is that of a pressure vessel commonly used in connection with spiral wound modules, many other housing configurations may be used. Such housings are commonly molded from plastic, formed from fiber reinforced thermoset materials (glass fiber reinforced epoxy), or formed from metal. Various combinations of fluid inlets and outlets may be used. Such fluid inlets and outlets may be positioned at various locations along the housing as is well known in the art.

Figure 3:
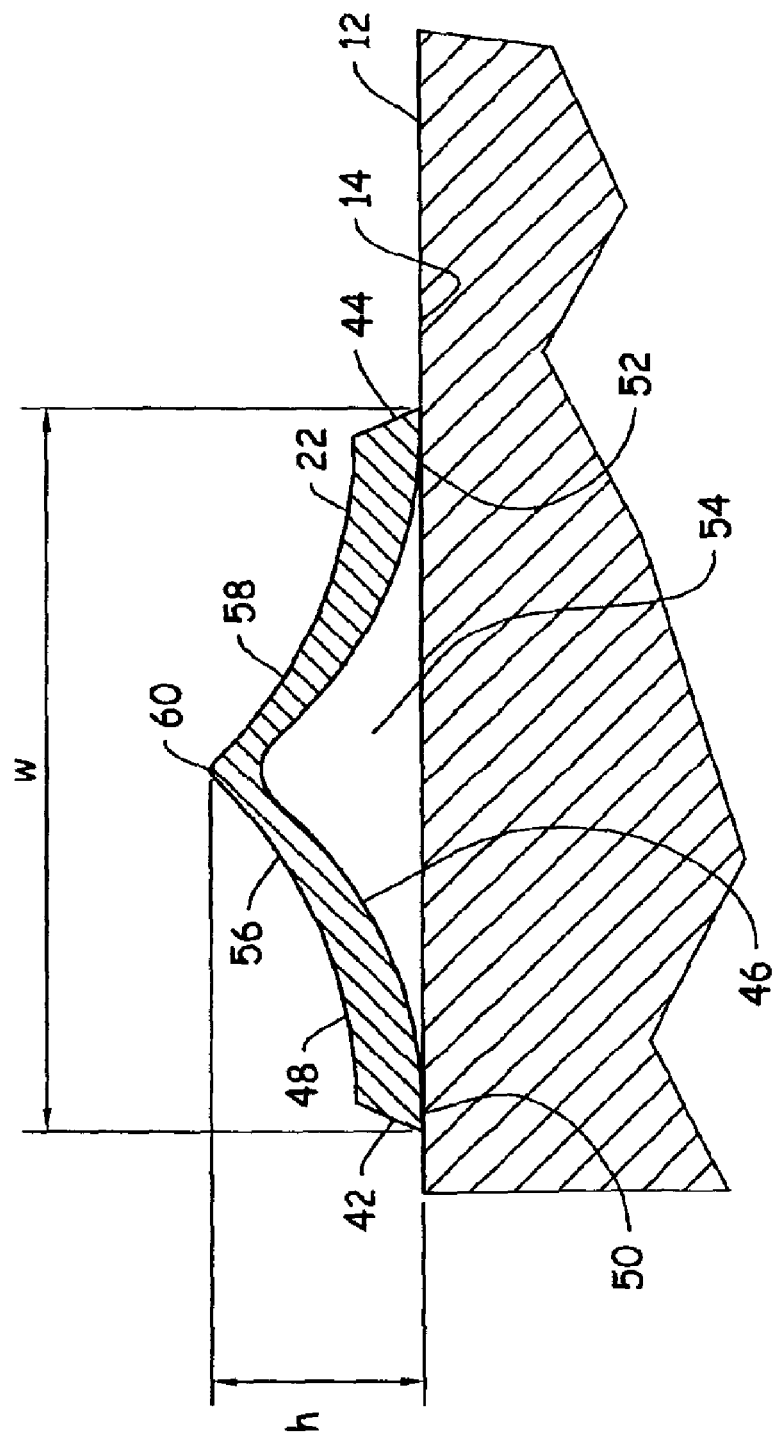
FIG. 3 is a cross-sectional, partially cut-away elevational view of a fluid filter assembly according to one embodiment of the invention including a filter module and seal.

FIG. 3 is an enlarged, cross-sectional, partially cut-away elevational view of a fluid filter assembly of FIG. 1. As will be described, several dimensions of the seal have been exaggerated to facilitate description. The seal (22) is shown having a width (w) extending between opposing ends (42, 44) and an inner (46) and outer (48) surface. The inner surface (46) is located adjacent the outer periphery (14) of the filter module (12) and the outer surface (48) is located opposite of the inner surface (46), i.e. facing away from the filter module (12). The inner surface (46) includes at least two parallel contact surfaces (50, 52) separated by a channel (54). The contact surfaces (50, 52) are in sealing engagement about the outer periphery (14) of the filter module (12). The contact surfaces (50, 52) essentially form parallel bands about the outer periphery (14) of the filter module (12). The outer surface (48) comprises a tapered surface (56, 58) extending from an apex (60) toward each opposing end (42, 44) of the seal (22). As shown, the apex (60) is located directly opposite (i.e. directly above) the channel (54) of the inner surface (46), centrally located between the ends (42, 44) of the seal (22) and extends in a direction opposite (i.e. away) from the filter module (12). The outer most tip of the apex (60) preferably has a radius of curvature from about 0 to 2 mm, preferably 0 to 1 mm, more preferably from about 0 to 0.5 mm, and still more preferably from about 0.1 to 0.3 mm. (As shown in FIG. 2 and described elsewhere, the apex sealing engages with the inner periphery of the housing.) In the embodiment of FIG. 3, the tapered surfaces (56, 58) are concave surfaces extending outwardly from the apex (60) toward each opposing end (42, 44). While shown as symmetric, the tapered surfaces (56, 58) need not be symmetric. For example, the degree of curvature of each surface (56, 58) may be different from each other. Similarly, the apex (60) need not be located in the exact center between the opposing ends (42, 44); however the apex (60) is preferably located within a middle third of the width (w) of the seal (22). In the embodiment shown in FIG. 3, the outer surface (48) of the seal (22) defines a tractrice curve. While somewhat exaggerated in FIG. 3, the channel (54) preferably comprises from 5 to 50% of the width (w) of the seal. Also shown exaggerated, the seal (22) has a thickness defined by the distance between the inner surface (46) and outer surface (48), wherein the thickness of the seal at the contact surfaces (50, 52) is greater than the distance between the height of the channel (54) and the height (h) of the apex (60). That is, the thickness of the seal material is relatively thinner near the apex (60) as compared with near the ends (42, 44). In other embodiments, the thickness of the seal material is relatively uniform across its entire width (w).

Figure 4:
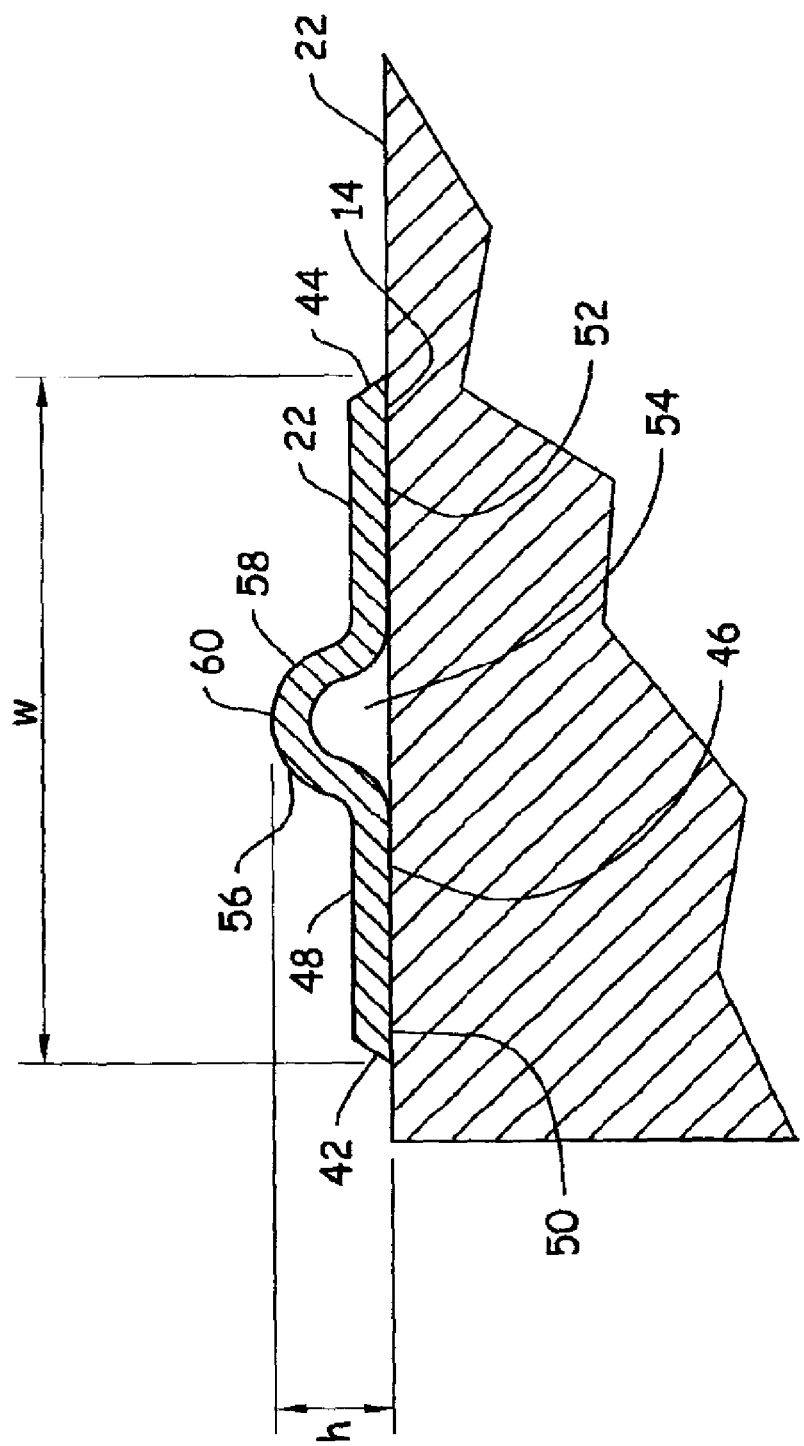
FIG. 4 is a cross-sectional, partially cut-away elevational view of a fluid filter assembly according to another embodiment of the invention including a filter module and seal.

FIG. 4 is enlarged, cross-sectional, partially cut-away elevational view of a fluid filter assembly showing an alternative embodiment of the seal. In distinction from the seal embodiment shown FIG. 3, the tapered surfaces (56, 58) of the seal (22) are convex rather than concave. That is, the outer surface (48) comprises a convex surface extending from the apex (60) toward each opposing end (42, 44) of the seal (22). Unlike the embodiment of FIG. 3, the seal (22) of FIG. 4 is shown having a relatively uniform material thickness. The seal of FIG. 4 also includes relatively large contact surfaces (50, 52) and a narrower channel (54), as compared with the embodiment of FIG. 3.

FIGS. 5-A and 5-B show an embodiment of an uninstalled seal (22) similar to that shown in FIGS. 1, 2 and 3. The seal (22) is ring-shaped and includes "V-shaped" cross-section, best shown in FIG. 5-B. The inner periphery (i.e. inner diameter) of the seal is preferably smaller (e.g. 5-25%) than the outer periphery of the filter module of the filter assembly. The seal can be installed about a filter module by stretching or deforming the seal about the outer periphery of the filter module so that the contact surfaces sealingly engage with the outer periphery of the filter module. Once installed about a filter module, the former V-shaped assumes more of a tractrice curvature with two concave surfaces joining at a central apex, as best shown in FIG. 3.

FIGS. 6-A and 6-B show an alternative embodiment of an uninstalled seal (22) similar to that shown in FIG. 4.

The size and shape of the channel (54) of the subject seals are not particularly limited. The inner surface (46) may include more than two contact surfaces (50, 52) and more than two channels (54); however in several preferred embodiments of the invention, the inner surface of the seal comprises two parallel contact surfaces separated by one channel. While not required, the channel is preferably centrally located along the width of the seal; e.g. within about the middle third of the width of the seal. The channel preferably comprises from about 5 to 50 percent of the total width (w) of the seal, and from about 5 to 75 percent of the total height (h) of the seal.

The seal is preferably pre-formed from an elastomeric material such as an ethylene-propylene diene M-class rubber (EPDM), neoprene, buna rubbers, ethylene-vinyl acetate (EVA), polyethylene, polypropylene, polyurethane and silicone materials. Preferred materials have a Type A durometer of from 50-100, preferably 60-90 and more preferably from 70-80 as measured by ASTM D2240-05 Type A. An example of a preferred material includes EPDM having a Type A durometer of 60-90, but more preferably from 70-80. Preferred elastomeric materials also have a tensile strength of from about 5-40 MPa, preferably from 7-21 MPa and more preferably from 10-17 MPa as measured by ASTM D 412-06; an elongation of from about 100-1000%, preferably from 200-600% and more preferably from 300-500% as measured by ASTM D 412-06; and a modulus (100%) of from about 0.5-5, preferably from 1-4 MPa and more preferably from 2.0-3.5 MPa as measured by ASTM D 412-06. Depending upon the specific application of the filter assembly, the seal may need to be made from governmental approved materials, such as peroxide cured, food grade EPDM rubber.

In preferred embodiments, the subject seals provide an interference fit which is adjustable. That is, the height (h) of the seal can be changed by manually adjusting the location of the contact surfaces of the seal (i.e. by adjusting the width (w) of the seal), or the apex of the seal may deform due to the presence of the underlying channel. The feature of "adjustability" allows for more variance in sizing of modules and housings. For example, if the seal height of a particular assembly is too high, the apex of the seal may deform inward due to the underlying channel. That is, upon insertion within a housing, the contact between the inner periphery of the housing and the apex of the seal is sufficient to deform the apex of the seal downward into the channel region. This aspect of preferred embodiments of the invention allow the use of otherwise non-compressible materials for seal construction, i.e. non-foam materials having high tensile strength and modulus as described above. The use of seals having variable thickness can increase the range of seal deformation. For example, as described in connection with the embodiment of FIG. 3, the seal material may be relatively thinner in the region of the apex to allow for greater deformation under load (i.e. force from engagement with the inner periphery of the housing). Meanwhile, the seal material may be relatively thicker in the region of the contact surfaces to provide a stronger interference fit about the filter module, i.e. higher hoop strength.

For purposes of the present description, the term "filter" is intended to include a wide range of separation mechanisms including but not limited to: pore flow, solution-diffusion, ion exchange, adsorption and chelation. The invention is applicable for "filtering" a wide range of fluids including both gases and liquids. Examples of common liquid separations include organic and aqueous-based feeds. The invention includes a wide range of applications including but not limited to microfiltration, ultrafiltration, nanofiltration, reverse osmosis and pervaporation.

It should be understood that the intent of this description is not to limit the invention to the particular embodiments described, but rather to cover all modifications, equivalents, and alternatives falling within the spirit and scope of the disclosure. Many embodiments of the invention have been described and in some instances certain embodiments, selections, ranges, constituents, or other features have been characterized as being "preferred". The designation of a feature as being "preferred" should not be interpreted as deeming such features as an essential or critical aspect of the invention.

While not required for purposes of describing the present invention, the entire content of each of the aforementioned patents and patent applications are fully incorporated herein by reference.

The invention claimed is:

1. A fluid filter assembly comprising:
   i) a spiral wound filter module comprising a permeate tube defining a central axis extending along the length of the module between two opposite ends and a cylindrical outer periphery extending along the length between the two opposite ends;
   ii) a ring-shaped seal disposed about a portion of the outer periphery of the spiral wound filter module,
   wherein the seal has a width extending between opposing ends and comprises:
   an inner surface comprising at least two parallel contact surfaces separated by a channel, wherein the contact surfaces form parallel bands about the outer periphery of the filter module and are in sealing engagement with the outer periphery of the filter module, and
   an outer surface located opposite the inner surface and comprising tapered surfaces extending from an apex toward the opposing ends of the seal, wherein the tapered surfaces of the outer surface comprise either concave or convex surfaces extending from the apex toward the opposing ends of the seal, and
   wherein the apex is:
     centrally located between the opposing ends and directly opposite the channel, and extends away from the filter module; and
   iii) a housing including an inner periphery, wherein the spiral wound filter module and seal are positioned within the housing with the apex of the seal deflected inward into the channel and in sealing engagement with the inner periphery of the housing.

2. The assembly of claim 1 wherein the tapered surfaces of the outer surface comprise concave surfaces extending from the apex toward the opposing ends of the seal.

3. The assembly of claim 2 wherein the outer surface of the seal comprises a tractrice curvature.

4. The assembly of claim 1 wherein the tapered surfaces of the outer surface comprise convex surfaces extending from the apex toward the opposing ends of the seal.

5. The assembly of claim 1 wherein the channel comprises from 5 to 50% of the width of the seal.

6. The assembly of claim 1 wherein the seal is sealingly engaged about the outer periphery of the filter module by way of an interference fit.

7. The assembly of claim 1 wherein the seal has a thickness defined by the distance between the inner surface and outer surface, wherein the thickness of the seal at the contact surfaces is greater than the distance between the height of the channel and the height of the apex.

8. The assembly of claim 1 claim 1 wherein the seal comprises a material having a Type A durometer of from 70-80 as measured by ASTM D2240-05; and a tensile strength of 10-17 MPa, a modulus of 2-3.5 MPa and an elongation of from 200-600% as measured by ASTM D412-06.

9. The assembly of claim 1 wherein the apex of the seal has a radius of curvature from 0 to 2 mm.

* * * * *